United States Patent Office 3,412,106
Patented Nov. 19, 1968

3,412,106
2,6-DIHYDROCARBYL BENZYL HALIDE-DIOXANE COMPLEX AND METHOD OF MANUFACTURE
Joseph D. Odenweller, Bloomfield Hills, and Joseph T. Paruch, Warren, Mich., assignors to Ethyl Corporation, New York, N.Y., a corporation of Virginia
No Drawing. Filed Dec. 31, 1964, Ser. No. 422,519
11 Claims. (Cl. 260—340.6)

ABSTRACT OF THE DISCLOSURE

A crystalline complex is formed by reacting 2,6-dihydrocarbyl benzyl halides with dioxane. It is useful in the preparation of 3,5-dialkyl-4-hydroxybenzyl sulfides and dialkyl (3,5-dialkyl-4-hydroxybenzyl)phosphonates. The latter compounds are antioxidants.

---

This invention relates to new chemical compositions. This invention relates further to a chemical complex of a cyclic ether and a hydroxybenzyl halide. In particular, this invention relates to the chemical complexes of para-dioxane and 3,5-dialkyl-4-hydroxybenzyl chlorides.

Benzyl halides are known compounds and methods of preparing them are readily available. They are extremely useful chemical intermediates and react readily with compounds having a reactive hydrogen usually replacing the active hydrogen with the benzyl radical. The benzyl halides with which this invention is concerned are particularly useful because the benzyl radical also has the structure of an orthoalkylated hindered phenol. Thus, they are useful in the synthesis of many important antioxidants. For example, 3,5 - di-tert-butyl - 4 - hydroxybenzyl chloride reacts with 2,6-di-tert-butylphenol to form 4,4'-methylene bis(2,6 - di - tert - butyl)phenol, a commercial antioxidant.

Hydroxybenzyl halides containing a hindered hydroxyl group can be prepared by the reaction of the desired orthoalkylated phenol with formaldehyde and hydrogen halide. A difficulty frequently encountered with orthoalkylated hydroxybenzyl halides is that they are extremely difficult to purify because of their high boiling point and resistance to crystallization. In many instances they are obtained in the form of viscous glass-like materials. When used in this form to prepare derivatives, the derivatives are contaminated with various impurities, and, because of this, are difficult to purify through recrystallization. The present invention provides chemical complexes of such alkyl hydroxybenzyl halides that are readily purified through crystallization. The use of these new complexes allows the preparation of derivatives in pure readily crystallizable form.

An object of this invention is to provide new chemical compositions. A further object is to provide new and useful forms of hydroxybenzyl halides. A still further object is to provide chemical complexes of hydroxybenzyl halides and a dioxane. Another object is to provide chemical complexes of para-dioxane and hydroxybenzyl halides containing a sterically hindered hydroxyl radical. A particular object is to provide a molecular complex of para-dioxane and 3,5-di-tert-butyl-4-hydroxybenzyl chloride. Another object is to provide a process for preparing the new compositions of this invention. Additional objects will be apparent from the following detailed description and appended claims.

These and other objects are accomplished by providing a composition consisting of the complex of dioxane with a hydroxybenzyl halide, said hydroxybenzyl halide having the formula:

(I)

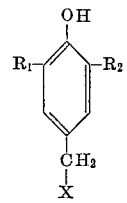

wherein X is a halogen and $R_1$ and $R_2$ are alpha-branched hydrocarbon radicals containing from 3 to about 12 carbon atoms. A preferred embodiment of this invention is the complex of dioxane with a hydroxybenzyl halide of Formula I wherein X is chlorine and $R_1$ and $R_2$ are secondary or tertiary alkyl radicals containing from 3 to about 12 carbon atoms. A particularly preferred embodiment is a composition consisting of a complex of para-dioxane and 3,5-di-tert-butyl - 4 - hydroxybenzyl chloride which crystallizes in the form of a white solid having a melting point of about 71° C.

It is believed that this new composition is a one to one mole ratio complex of dioxane and the hydroxybenzyl halide. Infrared analyses and elemental analyses of the complex obtained from reaction of para-dioxane and 3,5-di-tert-butyl - 4 - hydroxybenzyl chloride indicate, within the range of experimental error, that the mole ratio is one to one.

Another embodiment of the invention is a process for preparing the molecular complexes of this invention comprising the reaction of a dioxane with a hydroxybenzyl halide having Formula I wherein X is halogen and $R_1$ and $R_2$ are alpha-branched hydrocarbon radicals containing from 3 to about 12 carbon atoms. This process will henceforth be designated process (A).

In a more preferred embodiment of this process, X in the above structural formula is chlorine, and in a most preferred embodiment, X is chlorine and $R_1$ and $R_2$ are tert-butyl radicals.

Still another embodiment is a process for preparing a chemical complex of dioxane and a hydroxybenzyl halide comprising the reaction of hydrogen halide, a carbonyl compound, a hindered phenol and dioxane. This process will hereafter be designated process (B). A more preferred embodiment of this process comprises the reaction of hydrogen chloride, formaldehyde, 2,6-dialkylphenol and dioxane wherein the alkyl groups in the 2 and 6 position on the phenol are alpha-branched alkyl groups containing from 3 to about 12 carbon atoms.

A particularly preferred embodiment of the process of this invention leading to the formation of a complex of para-dioxane and 3,5-di-tert-butyl- 4 - hydroxybenzyl chloride comprises the reaction of hydrogen chloride, formaldehyde, 2,6-di-tert-butylphenol and para-dioxane.

In order to fully disclose the methods of carrying out process (A), the preparation of the required starting hydroxybenzyl halides will be described in detail. Following this description, the preferred methods of conducting process (A) will be described and illustrated.

The compositions of this invention can be prepared from hydroxybenzyl halides following the procedure of process (A). The preferred hydroxybenzyl halides are the para-hydroxybenzyl halides containing a sterically hindered hydroxyl group. Sterically hindered hydroxyl groups are those hydroxyl groups attached to a benzene ring in which the adjacent ortho positions are substituted with alpha-branched hydrocarbon radicals such as secondary or tertiary hydrocarbon radicals. Such substitution substantially shields the hydroxyl group and greatly changes the chemical and physical properties of the compound. In the following description, when the term "sterically hindered" is used it is understood to mean the steric hindrance of the hydroxyl group. Of these sterically hindered hydroxybenzyl halides, the still more preferred are the sterically hindered para-hydroxybenzyl chlorides and bromides. Thus, a further preferred class consists of the 3,5-dialkyl-4-hydroxybenzyl chlorides and bromides wherein the alkyl radicals located at the 3 and 5 positions are alpha-branched hydro-carbon radicals containing from 3 to about 12 carbon atoms. Examples of compounds of this preferred class are:

3,5-diisopropyl-4-hydroxybenzyl chloride,
3-($\alpha,\alpha$-dimethylbenzyl)-5-tert-butyl-4-hydroxybenzyl chloride,
3,5-di-($\alpha$-methylbenzyl)-4-hydroxybenzyl bromide,
3,5-dicyclohexyl-4-hydroxybenzyl chloride,
2,6-di-tert-butyl-$\alpha$-methyl-$\alpha$-chloro-para-cresol,
2,6-di-($\alpha,\alpha$-dimethylbenzyl)-$\alpha,\alpha$dimethyl-$\alpha$-bromo-para-cresol,
3,5-di-sec-butyl-4-hydroxybenzyl chloride,
3,5-di-tert-butyl-4-hydroxybenzyl bromide, and the like, A preferred class of 3,5-dialkyl-4-hydroxybenzyl halides consists of the 3,5-dialkyl-4-hydroxybenzyl chlorides, and the most preferred member of this class is 3,5-di-tert-butyl-4-hydroxy-benzyl chloride.

The hydroxybenzyl halides just discussed can be prepared from the reaction of a hydrogen halide, a carbonyl compound and a phenol.

Although any hydrogen halide can be employed, the preferred hydrogen halides are hydrogen chloride and hydrogen bromide. These may be employed in the form of the anhydrous gas or in a solvent such as an aqueous hydrogen halide. A most preferred hydrogen halide is hydrogen chloride, which leads to the formation of the preferred hydroxybenzyl chlorides.

The amount of hydrogen halide employed can vary from about one to about 10 moles per mole of phenol. A more preferred range is from about 2 to 8 moles of hydrogen halide per mole of phenol, and a most preferred range is from about 3 to 5 moles of hydrogen halide per mole of phenol.

The preferred carbonyl compounds are the simple aldehydes or ketones. The more preferred ketones are the low molecular weight ketones. A most preferred ketone is acetone. The use of aldehydes is generally preferred. The more preferred aldehydes are the low molecular weight aldehydes containing from one to about 6 carbon atoms. The still more preferred aldehydes are those containing from one to about 2 carbon atoms, and the most preferred aldehyde is formaldehyde.

The amount of carbonyl compound employed in the reaction can be varied from about one to 5 moles per mole of phenol. A more preferred range is from about 1.1 to 3 moles per mole of phenol, and a most preferred range is from about 1.2 to 2 moles per mole of phenol.

Any phenol having an unsubstituted ortho or para position can generally be employed in the preparation of hydroxybenzyl halides. The preferred phenols are hindered phenols having an unsubstituted para position. In making the preferred 3,5-dialkyl-4-hydroxybenzyl halides of this invention, the preferred starting materials are the orthoalkylated phenols wherein the alkyl group is branched in the alpha position. The more preferred orthoalkylated phenols are those wherein the alpha-branched alkyl group contains from 3 to about 12 carbon atoms. Examples of such orthoalkylated phenols are:

2,6-diisopropylphenol,
2-tert-butyl-6-($\alpha$,-dimethylbenzyl)phenol,
2,6-di-($\alpha$-methylbenzyl)phenol,
2,6-dicyclohexylphenol,
2,6-di-tert-butylphenol,
2,6-di-($\alpha,\alpha$-dimethylbenzyl)phenol,
2,6-di-sec-butylphenol,
2,6-di-($\alpha,\alpha$-dimethyl-4-isopropylbenzyl)phenol, and the like. The most preferred orthoalkylated phenol is 2,6-di-tert-butylphenol.

The orthoalkylated hindered phenols are readily prepared by reacting phenol with an olefinic compound. Examples of suitable olefinic compounds are propylene, butylene, isobutylene, styrene, $\alpha$-methylstyrene, diisobutylene, dodecylene, nonene, and the like. The reaction is carried out in the presence of an aluminum phenoxide catalyst. The temperatures employed in the reaction vary from about 50 to about 200° C., and the reaction times vary from about one-half to 10 or more hours. To obtain the elevated temperatures sometimes necessary in this reaction, pressure may be resorted to. However, when reacting a phenol with an aryl substituted olefinic compound, such as $\alpha$-methylstyrene, atmospheric pressure is sufficient. The procedure for making the orthoalkylated phenols is more fully described in U.S. Patent 3,075,832.

The reaction of the hydrogen halide, carbonyl compound and phenol is brought about by bringing all the reactants into contact under suitable reaction conditions whereby the hydroxybenzyl halide is formed.

The reaction can be carried out with or without a lqiuid reaction medium. When a liquid reaction medium is employed it should be inert to the reactants and the reaction products under the reaction conditions. Preferred liquid reaction media are aliphatic hydrocarbons, secondary or tertiary alcohols and water. The more preferred reaction media are secondary alcohols such as isopropyl alcohol, methylethyl carbinol, diethyl carbinol, and the like; or water. Due to its low cost, ready availability and the excellent results obtained by its use, water is the preferred liquid reaction medium.

When a liquid reaction medium is employed, a preferred quantity is from about 1 to 25 parts of reaction medium per part of phenol. A more preferred quantity is from 2 to 10 parts of reaction medium per part of phenol, and a most preferred range is from 3 to 5 parts of liquid reaction medium per part of phenol employed.

The reaction is carried out at a temperature high enough to cause the reaction but not so high as to destroy the product. A preferred temperature range is from about 0 to 150° C. A more preferred temperature range is from 0 to 100° C., and a most preferred temperature range is from about 20 to 75° C.

The reaction is usually conducted by placing the carbonyl compound, phenol and liquid reaction medium, if employed, in a reaction vessel equipped with an agitator and thermometer. Following this, the hydrogen halide is added. In a preferred method, the hydrogen halide is added as an anhydrous gas. Following this procedure, the gas is bubbled into the other reactants, while agitating under reaction conditions. The following examples illustrate the preparation of the hydroxybenzyl halides. All parts are parts by weight unless otherwise indicated.

Example I

To a reaction vessel equipped with agitator, thermometer and gas inlet tube was added 590 parts 37 percent aqueous hydrochloric acid, 120 parts 95 percent paraformaldehyde and 205.3 parts 2,6-di-tert-butylphenol. While stirring, anhydrous HCl was bubbled into the liquid phase over a 9 hour period while maintaining the reaction temperature at 40–55° C., with moderate cooling. The amount of hydrogen chloride passing through the reaction without reacting was measured by absorbing the exit gas in aqueous sodium hydroxide and determining the amount of sodium hydroxide neutralized. Following the 9 hour period, it was determined that 82 parts of hydrogen chloride had been consumed in the reaction or was retained in solution. Stirring was discontinued and the reaction mass separated into two phases. The upper liquid organic phase was separated and washed with 750 parts of 20 percent sodium chloride solution. Following this, it was dried over anhydrous calcium chloride yielding 241 parts of extremely viscous brown oil identified by vapor phase chromatography as 3,5-di-tert-butyl-4-hydroxybenzyl chloride.

Example II

In the same manner as employed in Example I, 206 parts of 2,6-di-sec-butylphenol, 600 parts of 37 percent aqueous hydrochloric acid and 65 parts of 95 percent paraformaldehyde are reacted while bubbling in anhydrous hydrogen chloride, yielding 3,5-di-sec-butyl-4-hydroxybenzyl chloride.

Example III

In the same manner as in Example I, 302 parts of 2,6-di-(α-methylbenzyl)phenol, 100 parts water, 300 parts isopropyl alcohol and 60 parts 95 percent paraformaldehyde are reacted while bubbling in anhydrous hydrogen chloride, yielding 3,5 - di - (α - methylbenzyl)-4-hydroxybenzyl chloride.

In like manner, any of the previously listed phenols can be employed in the above example in equal mole quantities. Furthermore, good results are obtained when other aldehydes or ketones are used. For example, the use of an equal mole quantity of acetaldehyde leads to the formation of 2,6-di-(α-methylbenzyl)-α-chloro-α-methyl-para-cresol. Likewise, when hydrogen bromide is used in place of hydrogen chloride the corresponding benzyl bromides are obtained.

Having fully described the methods of preparing the preferred hindered hydroxybenzyl halides used as starting materials to prepare the dioxane complexes of this invention, the following description sets forth the methods of preparing the complexes using process (A).

The dioxane complexes of this invention are prepared following the procedure of process (A) by the reaction of the forementioned hydroxybenzyl halides with dioxane. Although the dioxane may be substituted on its carbon atoms, the preferred dioxane is the simple unsubstituted dioxane. The most preferred dioxane is para-dioxane.

The complex is formed by bringing the reactants into contact under reacting conditions. This may be carried out with or without a solvent. Preferred solvents are those that do not lead to side reactions and in which both the hydroxybnezyl halides and dioxane are soluble. Examples of such solvents are ethers (such as diethyl ether, dipropyl ether, ethylene glycol diethyl ether, diethyleneglycol dimethyl ether, and the like), ketones (such as acetone, methylethyl ketone, diethyl ketone, and the like) and aliphatic hydrocarbons (such as pentane, hexane, heptane, isooctane, mixtures of low boiling aliphatic hydrocarbons such as petroleum ether, and the like). Excellent results are obtained when an excess of dioxane is used as the solvent. When this method is employed it is observed that the hydroxybenzyl halide at first goes into solution, following which a slight exothermic reaction occurs, and then the complex precipitates.

The reaction of the hydroxybenzyl halide with dioxane to form the new complex is usually complete within a few minutes. A more preferred reaction time is from one to 30 minutes and a most preferred reaction time is from 5 to 10 minutes. The reaction is preferably conducted at atmospheric pressure although pressure below and above atmospheric can be employed. Although the reaction can be conducted in the presence of air, it is preferably conducted in a substantially anhydrous environment.

The temperature at which the complex forms is not critical so long as the temperature is not high enough to cause the complex to disassociate. Excellent results are obtained by adding the hydroxybenzyl halide to the dioxane at room temperature. A preferred temperature range is from about 0 to 100° C. A more preferred temperature range is from about 10 to 75° C., and a most preferred temperature range is from about 20 to 50° C.

The method of preparing the new complexes following process (A) is so simple that, in most cases, it can be accomplished by merely pouring the hindered hydroxybenzyl halide into dioxane. The following example illustrates the preparation of the new compositions of this invention following the procedure of process (A). All parts are parts by weight unless otherwise indicated.

Example IV

In a reaction vessel, 10 parts of 3,5-di-tert-butyl-4-hydroxybenzyl chloride were added to 10 parts of para-dioxane. The 3,5-di-tert-butyl - 4 - hydroxybenzyl chloride went into solution, following which a white precipitate formed. The precipitate was removed by filtration and then recrystallized from hexane, yielding 6 parts of white crystals melting at 70–71° C. Analysis of the product was rendered difficult because the product appeared to be sensitive to atmospheric moisture which apparently can displace the dioxane from the complex. However, both infrared and carbon-hydrogen anlysis was obtained. Infrared analysis of the crystals show them to contain about 80 percent 3,5 - di - tert-butyl-4-hydroxybenzyl chloride. Carbon-hydrogen analyses were obtained. Theory for a 1:1 mole complex: C, 66.6%; H, 9.05%. Found: C, 68.5%; H, 9.2%. These results indicate that the molecular complex has a one to one mole ratio of 3,5-di-tert-butyl-4-hydroxybenzyl chloride to dioxane.

Example V

In the same manner as in Example IV, 10 parts of 3,5-di-sec-butyl-4-hydroxybenzyl bromide are added to 10 parts para-dioxane. After a short induction period, a complex of dioxane and 3,5 - di - sec - butyl-4-hydroxybenzyl bromide precipitates.

Example VI

In the same manner as in Example IV, 10 parts of 3,5-di-(α-methylbenzyl)-4-hydroxybenzyl chloride are added to 15 parts para-dioxane. After a short induction period, a complex of para-dioxane and 3,5-di-(α-methylbenzyl)-4-hydroxybenzyl chloride precipitates.

Example VII

Following the procedure of Example IV, 10 parts of each of the following compounds are added to 10 parts of para-dioxane.

3,5-diisopropyl-4-hydroxybenzyl chloride
3-(α,α-dimethylbenzyl)-5-tert-butyl-4-hydroxybenzyl chloride
3,5-di-(α-methylbenzyl)-4-hydroxybenzyl bromide
3,5-dicyclohexyl-4-hydroxybenzyl chloride
2,6-di-tert-butyl-α-methyl-α-chloro-para-cresol
2,6-di-(α,α-dimethylbenzyl)-α,α-dimethyl-α-bromo-para-cresol
3,5-di-sec-butyl-4-hydroxybenzyl chloride
3,5-di-tert-butyl-4-hydroxybenzyl bromide In each case, a dioxane complex of the hydroxybenzyl halide is obtained.

A further embodiment of this invention is another process for preparing the new dioxane complexes designated process (B). This process eliminates the need of first preparing the hydroxybenzyl halides and allows the direct formation of the dioxane complex. The process comprises the reaction of an orthoalkylated hindered phenol, a carbonyl compound, a hydrogen halide and dioxane. The preferred phenols, carbonyl compound and hydrogen halides are the same as those preferred in the previous description of the preparation of hydroxybenzyl halides. The preferred quantities of these reactants are also the same.

The process may be carried out by placing the dioxane, phenol and carbonyl compound in a reaction vessel and then passing anhydrous hydrogen halide into the stirred liquid phase. It can be conducted at any temperature high enough to promote the reaction but not high enough to cause degradation of the reactants or products. A preferred temperature range is from about 0 to 100° C. A more preferred temperature range is from 20 to 75° C., and a most preferred range is from about 35 to 50° C.

The quantity of dioxane employed can be as little as one mole per mole of hydroxybenzyl halide. When this quantity of dioxane is used, the reaction must either be conducted in a solvent or at a temperature high enough to maintain the complex formed in the liquid state. Otherwise, the entire mass will solidify before the reaction is complete.

If a supplemental solvent is employed it should be inert to the reactants and products under the reaction conditions. Examples of suitable solvents are aliphatic hydrocarbons or ethers. A highly preferred solvent is dioxane itself employed in quantities greater than actually required in the reaction. When dioxane is employed, a preferred amount is from about 100 to 500 parts of dioxane per 100 parts of phenol. A more preferred amount is from 100 to 300 parts of dioxane per 100 parts of phenol, and a most preferred quantity is from about 100 to 200 parts of dioxane per 100 parts of phenol.

In carrying out the reaction the hydrogen halide is passed into the liquid reaction phase at such a rate as to maintain the liquid phase saturated with the hydrogen halide. The amount of hydrogen halide required varies with the type and amount of solvent employed and with the reaction temperature. Only one mole of hydrogen halide per mole of phenol enters into the actual complex formation, but quantities in excess of this are required to maintain the saturated condition in the reaction mass. In most cases, from about 2 to about 10 moles of hydrogen halide per mole of phenol is sufficient.

Process (B) can be conducted at atmospheric pressure or at pressures below or above atmospheric. Although excellent results are obtained at atmospheric pressure, it is sometimes desirable to increase the pressure in order to increase the solubility of the hydrogen halide in the reaction mass. More preferred pressures are from atmospheric to about 100 p.s.i.g., and a most preferred pressure range is from atmospheric to about 15 p.s.i.g.

The reaction is usually complete in from 30 minutes to 8 hours. A more preferred time is from one to about 4 hours, and a most preferred reaction time is from 2 to about 3 hours.

The following examples illustrate the methods of carrying out process (B) of the present invention. All parts are parts by weight unless otherwise specified.

Example VIII

In a reaction vessel equipped with stirrer, thermometer and gas delivery tube was placed 620 parts of dioxane, 412 parts 2,6-di-tert-butylphenol and 95 parts of 95 percent paraformaldehyde. While stirring, anhydrous hydrogen chloride was passed into the liquid phase at a rate sufficient to maintain the reaction medium saturated with hydrogen chloride. During this period, the reaction temperature was allowed to rise to about 40° C. After one hour and 50 minutes, the reaction was complete and the hydrogen chloride feed was discontinued and the reaction mass cooled to 10° C. The white solids that precipitated were removed by filtration and dried under vacuum, yielding 595.4 parts of product. Water was added to the filtrate and an oil separated which was subsequently crystallized from hexane, yielding an additional 24.3 grams of product. The products were combined, yielding a total of 619.7 parts of 3,5-di-tert-butyl-4-hydroxybenzyl chloride-dioxanate, melting at 69–70° C. An infrared analysis of the product dissolved in carbon disulfide was obtained showing the presence of the following absorption bands.

Microns:
| | |
|---|---|
| 2.78 | Strong. |
| 3.25 | Weak. |
| 3.68 | Weak. |
| 8.95 | Strong. |
| 9.25 | Medium. |
| 9.55 | Medium. |
| 11.45 | Strong. |

These absorption peaks show the presence of a hindered phenolic hydroxyl group and dioxane in the white crystalline complex.

Example IX

In a reaction vessel equipped as in Example VIII was placed 930 parts of para-dioxane, 608 parts 2,6-di-tert-butylphenol and 142.5 parts of 95 percent paraformaldehyde. Anhydrous hydrogen chloride was passed into the reaction medium for 2.5 hours while maintaining the reaction temperature at 40° C. Following this, the reaction mass was cooled to 10° C. and the white crystalline product was removed by filtration. The white product was then washed with about 250 parts of petroleum ether, yielding 725.7 parts of product, which was identified by infrared analysis as 3,5-di-tert-butyl-4-hydroxybenzyl chloride-dioxanate.

Example X

In a reaction vessel equipped as in Example VIII is placed 206 parts of 2,6-di-sec-butylphenol, 60 parts paraformaldehyde, 100 parts para-dioxane and 500 parts of hexane. The temperature is raised to reflux while stirring, and then anhydrous hydrogen chloride is passed into the reaction mass at a rate sufficient to maintain a saturated hydrogen chloride solution. This is continued for 4 hours, after which the reaction mass is cooled to 10° C., and the dioxane complex of 3,5-di-sec-butyl-4-hydroxybenzyl chloride which precipitates is recovered by filtration.

In like manner, any of the preferred phenols listed previously may be employed in the above example, leading to the corresponding dioxane complex.

Moreover, hydrogen bromide may be used in place of hydrogen chloride in the above example, leading to the formation of the corresponding benzyl bromide-dioxane complex.

The complex compounds of this invention are extremely useful as intermediates in the preparation of many new compounds. This great utility is attributed to the reactivity at the alpha carbon atom to which the halogen is bonded. This utility is further enhanced by the purity of the intermediate made available by the new composition. Substitution reactions involving the removal of the chlorine atom facilitates the synthesis of many highly desirable ortho substituted phenolic and diphenolic compounds which themselves are excellent antioxidants and find utility in a wide range of organic media.

In one demonstration of the utility of the compounds of this invention as intermediates, they can be used in the preparation of the poly sulfur ethers of alpha and ortho substituted para-cresols. This is accomplished by reacting the compounds of this invention with sodium polysulfide. This is illustrated by the following example.

Example XI

A mixture of 19.3 parts of sodium sulfide dissolved in 15 parts of water, 120 parts of isopropyl alcohol and 70 parts of 3,5-di-tert-butyl-4-hydroxybenzyl chloride dioxanate is refluxed for 2 hours in a reaction vessel equipped with heating means, thermometer, condenser and stirrer. After standing for two days at room temperature, the solids that form are collected by filtration, washed with water and dried. They are identified by their melting point of 141–143° C. as α,α'-thiobis(2,6-di-tert-butyl) para-cresol.

Proceeding in the manner of the above example, good results are also obtained when other benzyl chloride dioxanates are reacted with sodium sulfides.

In a further demonstration of the utility of the compounds of this invention as intermediates they can be used in the preparation of dialkyl (α-substituted 3,5-di-substituted-4-hydroxybenzyl)phosphonates. This is accomplished by reacting the complex compounds of this invention with tri-alkyl phosphites. This utility is illustrated by the following example.

Example XII

In a reaction vessel equipped with a condenser, stirrer and heating means is placed 14.1 parts of 3,5-di-tert-butyl-4-hydroxybenzyl chloride dioxanate and 11.2 parts of triisopropyl phosphite dissolved in 50 parts of benzene. While stirring, this mixture is refluxed for 3 hours. Following this, the reaction mass is cooled and the benzene distilled at reduced pressure. The residue is recrystallized from petroleum ether, yielding diisopropyl-(3,5-di-tert-butyl-4-hydroxybenzyl)phosphonate.

The phosphorus and sulfur-containing compounds prepared from the intermediates of this invention are outstanding antioxidants in lubricating oil. To illustrate this property a standard oil oxidation test is used. The equipment and test procedure described by Kroger et al., Erdol and Kohle, 2, page 398 (1949) served as a basis for the test. The equipment and procedures are slightly modified in order to make the oxidizing conditions more strenuous. In this manner the test lubricants are subjected to severe oxidizing conditions, in order to conclusively establish the effectiveness of additives under very adverse conditions. Furthermore, the modifications are found to provide results which correlate extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation, which is shown by a rapid oxygen uptake. In all cases, the test oil is deliberately contamintaed with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In this test, at 150° C. base oils alone had induction times of from 3–22 minutes, while the base oils containing $2 \times 10^{-4}$ moles per liter of dimethyl(3,5-di-tert-butyl-4-hydroxybenzyl)phosphonate and base oils containing $1.0 \times 10^{-2}$ moles per liter of α,α'-thiobis(2,6-di-tert-butyl-p-cresol) had induction times, respectively, of 119 and 129 minutes, thus showing unusual improvement over the base oil.

Having fully described the new compositions of this invention, methods of preparing these compositions and the great utility afforded by their use, it is desired that this invention be limited only within the scope of the following claims.

We claim:

1. The molecular complex of dioxane with a hydroxybenzyl halide, said hydroxybenzyl halide having the formula:

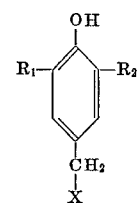

wherein X is a halogen and $R_1$ and $R_2$ are alpha-branched hydrocarbon radicals containing from 3 to about 12 carbon atoms.

2. A composition of claim 1 wherein said halogen is chlorine.

3. The crystalline complex of para-dioxane and 3,5-di-tert-butyl-4-hydroxybenzyl chloride.

4. A process for the preparation of the molecular complex of dioxane with a hydroxybenzyl halide, said hydroxylbenzyl halide having the formula:

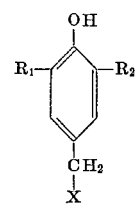

wherein X is a halogen and $R_1$ and $R_2$ are alpha-branched hydrocarbon radicals containing from 3 to about 12 carbon atoms, said process comprising the reaction of a phenol having the formula:

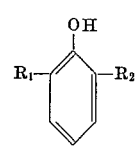

wherein $R_1$ and $R_2$ are alpha-branched hydrocarbon radicals containing from 3 to about 12 carbon atoms, with a hydrogen halide, formaldehyde, and dioxane.

5. The process of claim 4 wherein X is chlorine and said hydrogen halide is hydrogen chloride.

6. The process of claim 4 carried out in a para-dioxane reaction medium.

7. The process of claim 4 carried out at a temperature of from 0 to 100° C.

8. A process for the preparation of the complex of para-dioxane and 3,5-di-tert-butyl-4-hydroxybenzyl chloride said process comprising the reaction of hydrogen chloride, formaldehyde, 2,6-di-tert-butylphenol and dioxane.

9. A process for the preparation of the molecular complex of dioxane and a hydroxybenzyl halide, said process comprising the reaction of dioxane with a hydroxybenzyl halide having the formula:

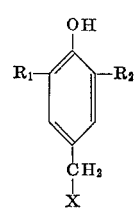

wherein X is halogen and $R_1$ and $R_2$ are alpha-branched hydrocarbon radicals containing from 3 to about 12 carbon atoms and recovering said molecular complex.

10. The process of claim 9 wherein X is chlorine.

11. The process of claim 10 wherein $R_1$ and $R_2$ are tert-butyl radicals.

References Cited

UNITED STATES PATENTS 3,065,275  11/1962  Goodard.

NICHOLAS S. RIZZO, *Primary Examiner.*

J. H. TURNIPSEED, *Assistant Examiner.*